(12) United States Patent
Proulx et al.

(10) Patent No.: US 8,238,265 B2
(45) Date of Patent: Aug. 7, 2012

(54) AUTO-BINDING SDP RSVP LSP TUNNEL

(75) Inventors: Denis Armand Proulx, Ottawa (CA); James Goodfellow, Ottawa (CA)

(73) Assignee: Alcatel Lucent, Paris (FR)

( * ) Notice: Subject to any disclaimer, the term of this patent is extended or adjusted under 35 U.S.C. 154(b) by 172 days.

(21) Appl. No.: 12/437,191

(22) Filed: May 7, 2009

(65) Prior Publication Data

US 2010/0284302 A1    Nov. 11, 2010

(51) Int. Cl.
  *H04L 12/28*  (2006.01)
  *H04L 12/56*  (2006.01)
(52) U.S. Cl. ................... 370/254; 370/395.53
(58) Field of Classification Search ............ None
  See application file for complete search history.

(56) References Cited

U.S. PATENT DOCUMENTS

| | | | |
|---|---|---|---|
| 7,281,038 B1 * | 10/2007 | Salkewicz | 709/223 |
| 7,366,109 B2 * | 4/2008 | Ashwood-Smith | 370/254 |
| 7,590,115 B1 * | 9/2009 | Aggarwal et al. | 370/390 |
| 7,668,949 B1 * | 2/2010 | Allan | 709/223 |
| 7,751,405 B1 * | 7/2010 | Kompella | 370/395.2 |
| 2002/0099849 A1 * | 7/2002 | Alfieri et al. | 709/243 |
| 2003/0177221 A1 * | 9/2003 | Ould-Brahim et al. | 709/223 |
| 2005/0213513 A1 * | 9/2005 | Ngo et al. | 370/254 |
| 2006/0092857 A1 * | 5/2006 | Ansari et al. | 370/254 |
| 2006/0168279 A1 * | 7/2006 | Lee et al. | 709/230 |
| 2007/0078969 A1 * | 4/2007 | Ngo et al. | 709/224 |
| 2009/0213860 A1 * | 8/2009 | Liu et al. | 370/395.53 |

OTHER PUBLICATIONS

Rosen, D., BGP/MPLS IP Virtual Private Networks (VPNs), Network Working Group, Request for Comments: 4364, Obsoletes: 2547, Feb. 2006.

* cited by examiner

*Primary Examiner* — Chirag Shah
*Assistant Examiner* — Suk Jin Kang
(74) *Attorney, Agent, or Firm* — Kramer & Amado P.C.

(57) ABSTRACT

The invention is directed to an apparatus and method for providing automatic binding of Virtual Private Routed Network (VPRN) over MPLS SDP RSVP LSP tunnels in a provider-managed IP/MPLS network.

20 Claims, 3 Drawing Sheets

| | |
|---|---|
| Service Name: | VPNA ▼ — 302, 303 |
| Service Description: | ACME Telco — 304 |
| Service ID: | 4021 — 306 |
| Number of Sites: | 0 — 308 |
| Operational Status: | down — 310 |

Select — 315

| | |
|---|---|
| Site ID: | 10.1.1.52 — 312 |
| Site Name: | Sim199_52 ▼ — 314 |
| RD Admin Value: | 4445 — 316 |
| Max No of Routes: | 5000 — 318 |
| Enable BGP: | Yes ○  No ● |
| 322 | |
| Tunnel Transport Type: | ○ MPLS:RSVP-LSP |
|  | ○ MPLS-LDP |
| 324 | ● MPLS:RSVP-LSP & MPLS-LDP |
| 326 | |
| Create Spoke Bindings?: | Yes ●  No ○ |

AUTO-BINDING SDP RSVP LSP TUNNEL

FIELD OF THE INVENTION

The invention is directed to packet switching communication networks, particularly providing automated binding services to MPLS tunnels.

BACKGROUND OF THE INVENTION

A Virtual Private Routed Network (VPRN) is a layer 3 service that uses Multi-Protocol Label Switching (MPLS) label stacking to implement a layer 3 Virtual Private Network (VPN). VPRNs allow multiple customer sites to communicate securely at the IP (Internet Protocol) level over a provider-managed IP/MPLS network by creating multiple, distinct customer routed networks that are fully isolated from each other. VPRNs are also known as: "Layer 3 Backbone VPN", "Border Gateway Protocol (BGP)/MPLS-based VPN", "Layer 3 MPLS based VPN"; "tag-switching network" or "MPLS-based IP VPN" and are based on the RFC4364 specification form the Internet Engineering Task Force (IETF).

VPRNs can simplify the routing topology at customer sites and can offload the managing of the core network from the customer to the service provider, while maintaining security similar to existing layer 2 technologies such as ATM or Frame Relay. Customers can receive the redundancy benefits designed into the provider core network.

VPRNs use transport tunnels such as, for example, Label Distribution Protocol (LDP) tunnels, Generic Route Encapsulation (GRE) tunnels or Resource Reservation Protocol (RSVP) Label Switched Path (LSP) tunnels, to encapsulate packet traffic.

Transport tunnels are employed in communications, networks, and networking equipment (e.g., routers, switches, hubs, etc.) to route data between endpoints, such as between provider edge (PE) routers on the edge of a provider network. In some instances, transport tunnels may be used to forward packets through a network that does not support the particular packet protocol in use. For example, a transport tunnel may be used to forward a non-IP packet across an IP network, multicast packets across a unicast network, etc.

Services (e.g., leased lines, virtual leased lines (VLL), VPRNs, etc.) may be bound to a transport tunnel and often numerous services may be associated with a single transport tunnel.

Although auto binding of VPRN services to LDP tunnels and GRE tunnels is possible with commercially available telecommunication equipment, there appears to be no available systems to automatically bind VPRN services over MPLS RSVP LSP type tunnels.

It is not uncommon for telecommunications service providers to assign one group of personnel to provisioning transport tunnels and a second group of personnel to provisioning services on those transport tunnels. These two functions require different knowledge of network parameters and configuration. It is not uncommon to use a command line interface (CLI) at each network node, such as a router or switch for provisioning both the transport tunnels and the services on those tunnels.

In a typical commercial embodiment of a telecommunications network, there can be hundreds of nodes or network elements such as routers and switches and thousands of services running over those nodes. The number of transport tunnels and the number of bindings of services to those tunnels required to provide full-mesh connectivity between network elements or nodes for a VPRN service can be very large for large networks. To illustrate, if the number of network elements is represented by "n", the number of bindings required to provide full-mesh connectivity would be $n^2-n$. Thus, for example, a network with 200 network elements would require 39800 tunnels and 39800 tunnel bindings for full-mesh connectivity. Manually provisioning a VPRN service over such a network would be very time-consuming, error prone.

Therefore, a means of reducing the time to provision VPRN services and minimize operator error would be desirable.

SUMMARY OF THE INVENTION

One aspect of the invention is directed to providing a network administration method for automatically provisioning a Layer 3 VPN (VPRN) in a packet switching network, comprising steps of: selecting a VPRN; selecting nodes using the VPRN; determining mesh topology requirements; ensuring availability of at least one RSVP-LSP tunnel from each node to each other node for the mesh requirements; binding of the VPRN to one of the at least one RSVP-LSP tunnel from each node to each other node for said mesh requirements.

In some embodiments of the invention, the step of ensuring availability of at least one RSVP-LSP tunnel comprises a step of provisioning an RSVP-LSP tunnel if at least one RSVP-LSP tunnel is not available.

Some embodiments of the invention further comprise a step of selecting one of the at least one RSVP-LSP tunnel from a plurality of RSVP-LSP tunnels according to defined customer rules.

In some embodiments of the invention the customer rules comprise one or more of: tunnel not allowed by label; tunnel not allowed by ID; select first available tunnel; select tunnel by name; select tunnel by type; select tunnel by bandwidth; select tunnel by forwarding class; select least used tunnel; and select tunnel by round robin.

In some embodiments of the invention the step of determining mesh topology requirements comprises selecting from the set of: full-mesh; and hub-and-spoke.

In some embodiments of the invention the step of selecting a VPRN comprises selecting said VPRN from a list of VPRNs pre-defined in a network management system.

Some embodiments of the invention further comprise steps of: verifying that Multi-Protocol Label Switching (MPLS) is configured in the network; and configuring Resource Reservation Protocol (RSVP) label signaling.

In some embodiments of the invention, the method is performed through a user interface.

Another aspect of the present invention provides a program storage device readable by a machine, tangibly embodying a program of instructions executable by the machine to perform method steps of selecting a VPRN; finding nodes using the VPRN; determining mesh topology requirements; ensuring availability of at least one RSVP-LSP tunnel pair between each node pair for the mesh requirements; and binding of the VPRN to one of the at least one RSVP-LSP tunnel between each node pair for the mesh requirements.

Another aspect of the present invention provides an apparatus for automatically provisioning a Layer 3 VPN (VPRN) in a packet switching network. The apparatus has a service application running on a service platform, providing a user interface for receiving from a user: a VPRN selection; selection of nodes; and a selection of mesh topology requirements. The apparatus further has an ensuring means for ensuring availability of at least one RSVP-LSP tunnel from each node to each other node for said mesh topology requirements; and a binding means for binding said VPRN to one of said at least one RSVP-LSP tunnel from each node to each other node for said mesh requirements.

Some embodiments of the present invention further comprise a service platform.

Some embodiments of the present invention further comprise a customer rules database for storing customer rules.

In some embodiments of the present invention the ensuring means comprises means for provisioning an RSVP-LSP tunnel if at least one RSVP-LSP tunnel is not available.

Yet another aspect of the present invention provides a system for automatically provisioning a Layer 3 VPN (VPRN) in a packet switching network, the system comprising; VPRN selecting means; means for selecting nodes using said VPRN; mesh topology selecting means determining mesh topology requirements; ensuring means for ensuring availability of at least one RSVP-LSP tunnel pair between each node pair for said mesh requirements; binding means for binding of said VPRN to one of said at least one RSVP-LSP tunnel between each node pair for said mesh requirements.

Advantageously, embodiments of the invention can be used to provision VPRN services over MPLS RSVP LSP transport tunnels in large networks in a timely manner.

BRIEF DESCRIPTION OF THE DRAWINGS

The foregoing and other objects, features and advantages of the invention will be apparent from the following more particular description of the preferred embodiments, as illustrated in the appended drawings, where:

FIG. 3 illustrates an embodiment of a user interface for a VPRN provisioning tool.

In the figures like features are denoted by like reference characters.

DETAILED DESCRIPTION

Figure 1:
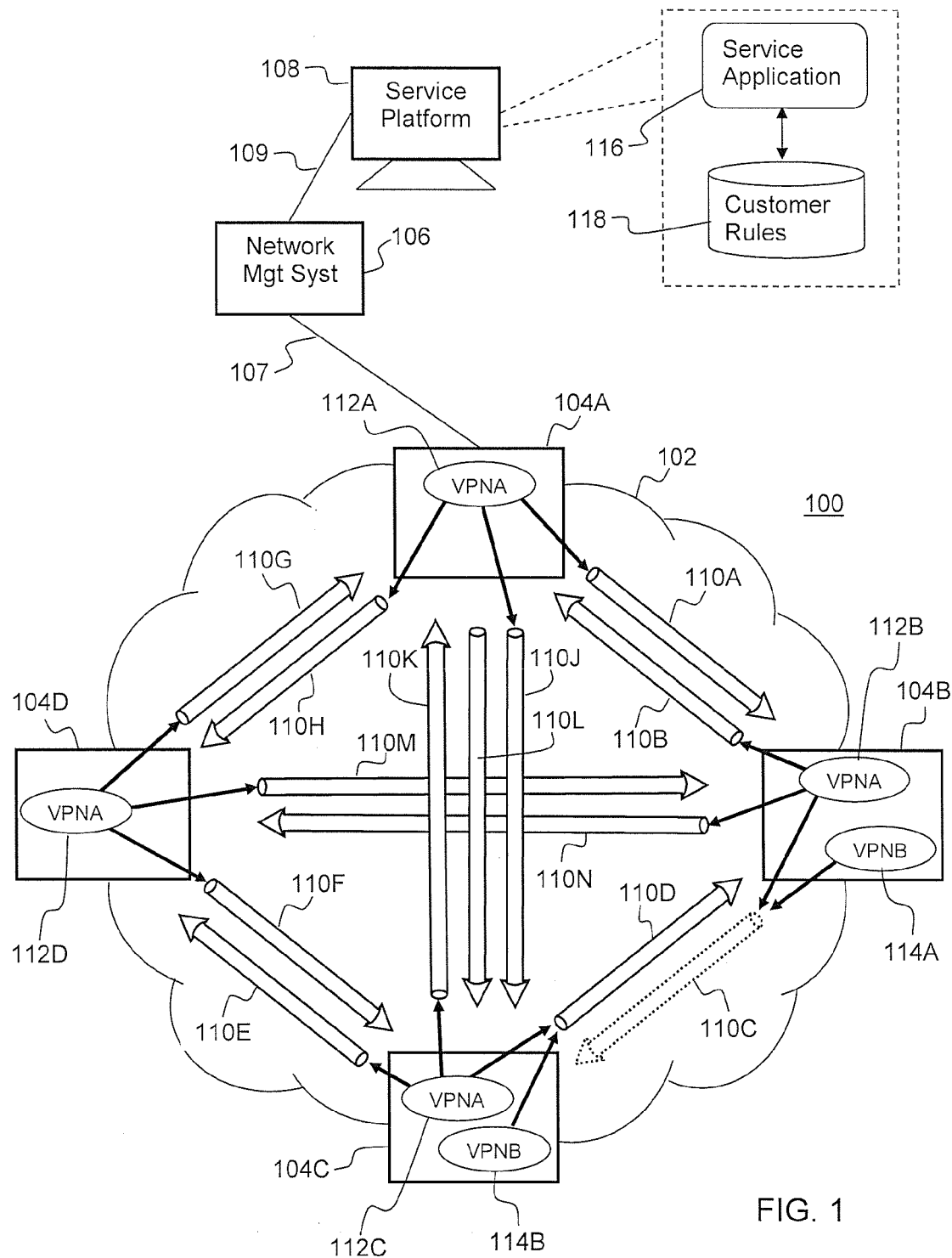
FIG. 1 illustrates a network configuration of VPRN services between network elements.

Referring to FIG. 1, a network configuration 100 for providing VPRN service over an Internet Protocol (IP) network 102 has network elements or nodes 104A, 104B, 104C, 104D. Network management system 106 is communicatively coupled to the network elements in the network via communication link 107. The network management system 106 is capable of performing operation, administration and maintenance (OAM) type functions on the network elements. The network configuration 100 also includes a service platform 108 that is communicatively coupled to the network management system 106 via an open operating system (OS) interface 109. The service platform 108 executes a service application 116 in communication with customer rules 118 stored on the service platform 108. Service applications can provide various tools for streamlining OAM tasks and can include provisioning tools, diagnostic tools. The service platform 108 can also provide various user interfaces to allow access to these tools via terminals, computers, portable devices or handheld devices either directly connected or connected remotely (either wired or wirelessly) to the Network Management System 106. Using the open OS interface 109, the service platform 108 can issue OAM control commands to the network management system 106 including commands to effect provisioning changes at the network elements 104A, 104B, 104C, 104D.

In one embodiment of the invention, the service application is a service portal web application and the interface 109 is a HTTPS secure Web interface as would be well understood by persons skilled in the art.

Unidirectional transport tunnels 110A-N provide encapsulation of data between nodes 104A-D. For example, transport tunnel 110A provides encapsulation of data from node 104A to node 104B, transport tunnel 110B provides encapsulation of data from node 104B to node 104A, etc.

Figure 2:
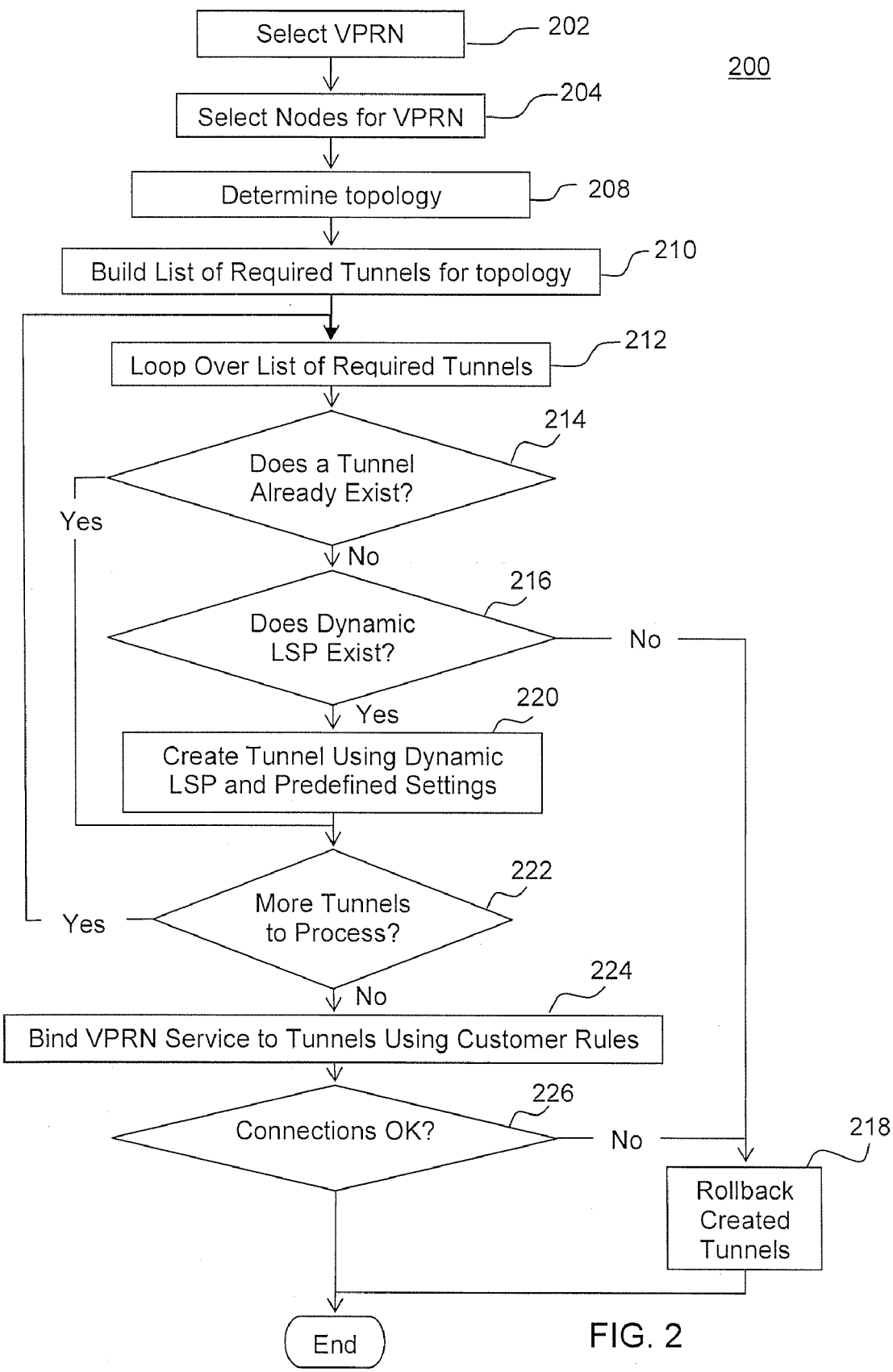
FIG. 2 illustrates a method of provisioning a VPRN service on the network of FIG. 1.

With reference to FIG. 1, FIG. 2, and FIG. 3, an embodiment of the process of the present invention will be described. A user, typically service personnel for a telecommunications service provider, accesses a service application software 116 on service platform 108. The user selects a VPRN service identifier "VPNA" at step 202, either by typing a suitable service identifier into input field 302 of a user interface 300 of the service application 116 or by selecting a predefined service identifier from a pull-down list accessed by clicking on field 303. The process queries the Network Management system 106 to provide a list of nodes configured for the VPRN service "VPNA". From FIG. 1, the list of nodes would include node 104A (VPNA 112A), node 104B (VPNA 112B), node 104C (VPNA 112C), node 104D (VPNA 112D). At step 204, the user selects nodes to include in the VPRN service "VPNA", from the list of nodes. The nodes can be selected one by one by highlighting individual nodes in the user interface or by selecting a radio button adjacent to each desired node name displayed on the user interface. Nodes can also be added to the list, thereby configuring the VPRN service on those nodes. This can be done through the user interface. Other methods of selecting nodes are contemplated as would be readily apparent to persons skilled in the art. In the example of FIG. 1, the user selects for "VPNA" 112A: nodes 104A, 104B, 104C, 104D are selected. At step 208 the mesh topology for the VPRN service is selected from a choice of Full-Mesh or Hub-and-Spoke. In this example, Full-mesh is selected.

The process continues at step 210 by building a list of transport tunnels required for the selected mesh topology. In the case of a Full-Mesh topology, a unidirectional transport tunnel is required from every node to every other node in the list of nodes selected at step 204. Thus with reference to the example of FIG. 1, transport tunnels are required between the following node pairs: from 104A to 104B; from 104B to 104A; from 104B to 104C; from 104C to 104B; from 104B to 104D; from 104D to 104B; from 104C to 104A; from 104A to 104C; from 104C to 104D; from 104D to 104C; from 104D to 104A; and from 104A to 104D. In this example the number of nodes in a full-mesh topology is 4 and the number of transport tunnels and bindings required is $4^2-4=12$. As the number of nodes increases, the number of transport tunnels required increases dramatically.

In the case of Hub-and-Spoke being selected at step 208, a unidirectional transport tunnel is required from every selected node to every other selected node within the list of nodes in the Hub-and-Spoke configuration.

At step 212 the list of required tunnels from step 210 is used to query the existence of suitable tunnels required for the selected topology. This is done by querying the Network Management system 106 through communication link 109, as would be well understood by a person skilled in the art. At step 214, the Network Management system 106 is queried for the existence of at least one transport tunnel from node 104A to node 104B. If at least one tunnel does exist, the process continues to step 222 to determine if there are more node pairs to be queried for tunnels and if so the process loops via step 212 to the next node pair in the list.

If at step 214, a query determines that there is not at least one transport tunnel, for example, from node 104B to node 104C, then at step 216, the process queries if Dynamic LSP services are provisioned on nodes 104B and 104C, and if so, at step 220, the process automatically creates a dynamic RSVP LSP tunnel 110C.

At step 216, if it is determined that Dynamic LSP is not provisioned on nodes 104B and 104C, then the process proceeds to step 218 where it rolls back any tunnels created by the process and the process terminates with an error message displayed to the user indicating that the lack of Dynamic LSP prevented creation of all of the required tunnels. In this manner, if the desired full-mesh provisioning of the VPRN service can not be accomplished successfully, the newly provisioned tunnels are not useful and are removed so a not to clutter the network management system.

At step 222, when the process determines that all node pairs have been queried and that the required tunnels exist between all node pairs, then the process moves to step 224 where the process creates the VPRN service by automatically binding the VPRN service "VPNA" to a transport tunnel between each node pair, using customer rules stored in customer rules database 118. Thus if only one transport tunnel 110A exists from node 104A to node 104B, then it is selected and VPRN service "VPNA" (112A) at node 104A is bound to transport tunnel 110A. If multiple tunnels exist, for example tunnels 110J and 110L from node 104A to node 104C, then customer rules are used to determine which tunnel to use.

Customer rules or preferences can include: lists of transport tunnels allowed to be associated with specific services; or not allowed to be associated with specific services; tunnel selection criteria such as: the first tunnel in a list; last tunnel in a list; round robin selection; equal sharing of services; tunnel ID matching a selection; tunnel name matching a string of characters; tunnel type matching a selection; tunnel bandwidth; 7 Forwarding class (AF, BF, . . . ); etc. These rules are stored in a customer rules database 118 within the Service platform 108 and accessible by Service Application software 116 on the service platform 108. Note that in other embodiments, the customer rules can be stored in other locations accessible by the service application software, as would be readily apparent to persons skilled in the art.

Thus, in the example of FIG. 1, tunnel 110J is selected from the choice of tunnel 110J and tunnel 110L according to customer rules and "VPNA" 112A is bound to tunnel 110J. Similarly, all the other required bindings are established between the VPNA services and the appropriate tunnels: "VPNA" 112A at node 104A is also bound to tunnel 110H; "VPNA" 112B at node 104B is bound to tunnels 110B, 110N, and 110C; "VPNA" 112C at node 104C is bound to tunnels 110D, 110E, 110K; and "VPNA" 112D at node 104D is bound to tunnels 110F, 110G, 110M, to provide full mesh connectivity for the VPRN "VPNA" service. VPRN services can share tunnels with other VPRN services if desired, for example VPRN service "VPNB" provisioned on node 104B as 114A and on node 104C at 114B, can share tunnels 110C and 110D with "VPNA" (112B and 112C). When provisioning VPRN services, the user can select customer rules depending on customer or type of service or other criteria as would be readily apparent to persons skilled in the art. Thus VPRN services can use different tunnels or the same tunnels as other VPRN services.

When the VPRN service is fully configured, at step 226, the process tests each VPRN connection, tunnel connection and tunnel binding using network tools within the service platform 108 or through calls to the OAM utilities within the Network management system 106, to ensure that the service is fully functional. If there are errors and the newly provisioned VPRN service does not function correctly, error messages are generated and the process proceeds to step 218 where it rolls back any tunnels created by the process to avoid cluttering the network management system.

In other embodiments of the present invention, step 218 of rolling back newly created tunnels is optional, in which case error messages are displayed indicating which tests failed to aid in diagnosing and correcting the issues preventing full provisioning of the VPRN service.

Embodiments of the present invention automate and greatly simplify the process of service provisioning for Layer 3 VPN Services (VPRN) by automating the steps required to provision and auto bind to MPLS RSVP LSP tunnels. For large networks on the order of hundreds of nodes, the present invention can enable the effective management and provisioning of VPRN services where the process would otherwise not be practical.

Referring to FIG. 3, an embodiment of a user interface 300 of the present invention is shown. User interface 300 is generated by the service application 116 operating on service platform 108 (FIG. 1). As described above, the user selects or types a name into the service name field 302. The user interface then populates the service description field 304 and the Service ID field 306 which can be edited by the user. The user interface also populates the number of sites field 308 with the number of nodes which have the Service provisioned, and the operational status field 310 of the service.

Site ID field 312 and Site Name field 314 display details of network nodes configured for the service. Which can be selected for inclusion for provisioning by clicking the select button 315. Other administrative service rules can be set via fields 316 and 318.

BGP protocol can be selected via radio buttons 322. Tunnel rules 328 can be selected via: radio button 324 for selecting Transport Tunnel type and radio button 326 to select full-mesh or spoke binding.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A network administration method for automatically provisioning a Layer 3 VPN service (VPRN service) in a packet switching network, the method comprising the steps of:
   selecting a VPRN service;
   selecting nodes using said VPRN service;
   determining mesh topology requirements;
   ensuring availability of at least one Resource Reservation Protocol-Label Switched Path (RSVP-LSP) tunnel from each node to each other node for said mesh requirements; and
   binding of said VPRN service to one of said at least one RSVP-LSP tunnel from each node to each other node for said mesh requirements.

2. The method of claim 1, wherein the step of selecting nodes using said VPRN service comprises adding nodes and deleting nodes from a list of nodes using said VPRN service.

3. The method of claim 1, wherein said step of ensuring availability of at least one RSVP-LSP tunnel comprises a step of provisioning an RSVP-LSP tunnel if at least one RSVP-LSP tunnel is not available.

4. The method of claim 3 further comprising a step of selecting said one of said at least one RSVP-LSP tunnel from a plurality of RSVP-LSP tunnels according to defined customer rules.

5. The method of claim 4, wherein said customer rules comprise one or more of: tunnel not allowed by label; tunnel not allowed by ID; select first available tunnel; select tunnel by name; select tunnel by type; select tunnel by bandwidth; select tunnel by forwarding class; select least used tunnel; and select tunnel by round robin.

6. The method of claim 1, wherein said step of determining mesh topology requirements comprises selecting from the set of: full-mesh; and hub-and-spoke.

7. The method of claim 1, wherein said step of selecting a VPRN service comprises selecting said VPRN service from a list of VPRN services pre-defined in a network management system.

8. The method of claim 1 further comprising steps of:
   verifying that Multi-Protocol Label Switching (MPLS) is configured in the network; and
   configuring Resource Reservation Protocol (RSVP) label signaling.

9. The method of claim 1 wherein said method is performed through a user interface.

10. A non-transitory program storage device readable by a machine, tangibly embodying a program of instructions executable by the machine to perform method steps for the method of claim 1.

11. An apparatus for automatically provisioning a Layer 3 VPN service (VPRN service) in a packet switching network, the apparatus comprising:
    a service application running on a service platform, providing a user interface for receiving from a user: a VPRN service selection; selection of nodes; and a selection of mesh topology requirements;
    ensuring means for ensuring availability of at least one Resource Reservation Protocol-Label Switched Path (RSVP-LSP) tunnel from each node to each other node for said mesh topology requirements;
    binding means for binding said VPRN service to one of said at least one RSVP-LSP tunnel from each node to each other node for said mesh requirements.

12. The apparatus of claim 11, further comprising said service platform.

13. The apparatus of claim 12 further comprising a customer rules database for storing customer rules.

14. The apparatus of claim 11, wherein said ensuring means comprises means for provisioning an RSVP-LSP tunnel if at least one RSVP-LSP tunnel is not available.

15. The apparatus of claim 13, wherein said binding means comprises means for selecting said one of said at least one RSVP-LSP tunnel from a plurality of RSVP-LSP tunnels according to said customer rules.

16. The apparatus of claim 15, wherein said customer rules comprise one or more of: tunnel not allowed by label; tunnel not allowed by ID;
    select first available tunnel; select tunnel by name; select tunnel by type; select tunnel by bandwidth; select tunnel by forwarding class; select least used tunnel;
    and select tunnel by round robin.

17. The apparatus of claim 11, wherein said mesh topology requirements are selected from the set of: full-mesh; and hub-and-spoke.

18. A method performed by a network management system of automatically binding tunnels to a network service, the method comprising:
    determining a set of nodes associated with the network service;
    determining a mesh topology for the network service;
    building a list of required tunnels based on the set of nodes and the mesh topology; and for each required tunnel in the list of required tunnels:
    determining whether at least one existing tunnel matches the required tunnel, and
    if at least one existing tunnel matches the required tunnel, binding an existing tunnel of the at least one existing tunnel to the network service.

19. The method of claim 18, further comprising, for each required tunnel in the list of required tunnels:
  if no existing tunnel matches the required tunnel, creating a new tunnel, wherein the new tunnel matches the required tunnel.

20. The method of claim 18, wherein the step of binding an existing tunnel of the at least one existing tunnel to the network comprises, if at least two existing tunnels match the required tunnel: determining at least one customer rule applicable to the network service; selecting an existing tunnel of the at least two existing tunnels based on the at least one customer rule; and binding the selected tunnel to the network service.

\* \* \* \* \*